US008586689B2

(12) United States Patent
Jung et al.

(10) Patent No.: US 8,586,689 B2
(45) Date of Patent: Nov. 19, 2013

(54) POLYMER, AND COMPOSITION AND FILM INCLUDING THE SAME

(75) Inventors: Young Suk Jung, Suwon-si (KR); Yoo Seong Yang, Yongin-si (KR); Tai Gyoo Park, Hwaseong-si (KR); Sang Mo Kim, Hwaseong-si (KR); Eun Seog Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 131 days.

(21) Appl. No.: 13/198,102

(22) Filed: Aug. 4, 2011

(65) Prior Publication Data

US 2012/0184688 A1 Jul. 19, 2012

(30) Foreign Application Priority Data

Jan. 18, 2011 (KR) .................. 10-2011-0005139

(51) Int. Cl.
*C08G 77/26* (2006.01)

(52) U.S. Cl.
USPC ............... 528/26; 528/35; 528/37; 528/41; 528/28; 528/29; 525/431; 525/446; 525/452; 525/464; 525/474

(58) Field of Classification Search
USPC ............ 528/35, 37, 41, 26, 28, 29; 525/431, 525/446, 452, 464, 474
See application file for complete search history.

(56) References Cited

FOREIGN PATENT DOCUMENTS

| JP | 2004352758 | 12/2004 |
| JP | 2005062235 | 3/2005 |

OTHER PUBLICATIONS

Ro, et al., "High-Modulus Spin-On Organosilicate Glasses for Nanoporous Applications," Advanced Materials 19: 705-710, Mar. 2007.

Schramm, et al., "Synthesis and characterization of an aliphatic monoimide-bridged polysilsesquioxane by the sol-gel route," J. Sol-Gel Sci. Technol. 53: 579-586, Dec. 2009.

Wohl, et al., "Modification of the surface properties of polyimide films using polyhedral oligomeric silsesquioxane deposition and oxygen plasma exposure," Applied Surface Science 255: 8135-8144, May 2009.

*Primary Examiner* — Margaret Moore
(74) *Attorney, Agent, or Firm* — Cantor Colburn LLP (57) ABSTRACT

A polymer including a structural unit represented by the following Chemical Formula 1, and a composition and a film including the same are provided.

[Chemical Formula 1]

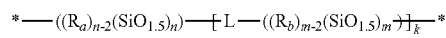

In the above formula at least one of $R_a$ and $R_b$ is either Chemical Formula 3 or Chemical Formula 4, as shown below.

[Chemical Formula 3]

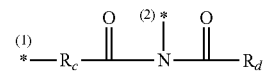

[Chemical Formula 4]

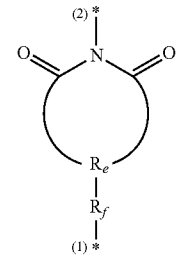

The polymer also includes units selected from polyamic acid, polyimide, polyaramid, polyamide, polyurethane, polycarbonate and polyacetal units and mixtures of such units.

18 Claims, 3 Drawing Sheets

POLYMER, AND COMPOSITION AND FILM INCLUDING THE SAME

CROSS-REFERENCE TO RELATED APPLICATION

This application claims priority to Korean Patent Application No. 10-2011-0005139 filed on Jan. 18, 2011, and all the benefits accruing therefrom under 35 U.S.C. §119, the content of which in its entirety is herein incorporated by reference.

BACKGROUND

1. Field

This disclosure relates to a polymer, and a composition and a film including the same. The polymers, compositions, and films are particularly useful for the manufacture of substrates for display devices.

2. Description of the Related Art

As the expansion of the mobile display market accelerates, light and flexible display devices are being actively developed. In a flexible display, a substrate determines the performance, reliability, and price of a display device. A glass substrate, which is generally used at present, may have excellent properties such as transparency, high heat resistance, and a low coefficient of thermal expansion ("CTE"). However, the glass substrate may not be sufficiently light and flexible for future mobile display technology. Hence, there is a need for development of a new material that satisfies the lightness and flexibility conditions.

Current plastic substrate candidate materials such as polyimides, polyethylenes, and naphthalates may not satisfy some conditions such as high heat resistance, transparency, and flexibility. Therefore, there have been attempts to manufacture a composite material of a polymer and an inorganic material by adding diverse additives, e.g., inorganic materials, to a polymer. However, the additives may not be effectively dispersed in a polymer matrix, and a dispersing agent added to disperse the additives may inhibit the performance of the polymer.

SUMMARY

An embodiment of this disclosure provides a polymer capable of having improved thermal properties and optical transmittance properties.

Another embodiment of this disclosure provides a composition and a film having improved thermal properties and optical transmittance properties.

According to yet another embodiment of this disclosure, a polymer including a structural unit represented by the following Chemical Formula 1 is provided.

[Chemical Formula 1]

In Chemical Formula 1, n and m are the same or different, and each independently range from 4 to 12, k is an integer ranging from 1 to 10, L is a selected from a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted C3 to C30 heterocycloalkylene group, a substituted or unsubstituted C6 to C30 arylene group, a substituted or unsubstituted C6 to C30 aryleneoxy group, a substituted or unsubstituted C2 to C30 heteroarylene group, a substituted or unsubstituted C2 to C30 alkenylene group, a substituted or unsubstituted C2 to C30 alkynylene group, and a substituted or unsubstituted C1 to C30 amide group, and $R_a$ and $R_b$ are each independently selected from hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted C2 to C15 heteroaryl group, a substituted or unsubstituted C2 to C15 alkenyl group, a substituted or unsubstituted C2 to C15 alkynyl group, $NH_2$, a substituted or unsubstituted C1 to C15 amine group, a substituted or unsubstituted C1 to C15 alkyleneamine group, a substituted or unsubstituted C6 to C15 aryleneamine group, a substituted or unsubstituted C1 to C15 alkenyleneamine group, and a functional group represented by the following Chemical Formula 2, provided that at least one of $R_a$ and $R_b$ is an anhydride-derived functional group represented by the following Chemical Formula 3 or Chemical Formula 4.

[Chemical Formula 2]

In Chemical Formula 2, $R_1$, $R_2$, and $R_3$ are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group.

[Chemical Formula 3]

In Chemical Formula 3, $R_c$ is selected from a substituted or unsubstituted C1 to C20 alkylene group, a substituted or unsubstituted C1 to C20 alkyleneoxy group, a substituted or unsubstituted C1 to C20 fluoroalkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C6 to C20 aryleneoxy group, a substituted or unsubstituted C2 to C20 heteroarylene group, a substituted or unsubstituted C2 to C20 alkenylene group, a substituted or unsubstituted C2 to C20 alkynylene group, and a substituted or unsubstituted C1 to C20 amide group, $R_d$ is selected from a substituted or unsubstituted C1 to C15 alkyl group, a substituted or unsubstituted C1 to C15 fluoroalkyl group, a substituted or unsubstituted C3 to C10 cycloalkyl group, a substituted or unsubstituted C2 to C10 heterocycloalkyl group, a substituted or unsubstituted C6 to C20 aryl group, and a substituted or unsubstituted C2 to C20 heteroaryl group,

*(1) denotes a link to silicon, and *(2) denotes a link to another unit of the polymer.

[Chemical Formula 4]

In Chemical Formula 4, $R_e$ is a substituted or unsubstituted C2 to C10 alkylene group, $R_f$ is selected from a single bond, a substituted or unsubstituted C1 to C20 alkylene group, a substituted or unsubstituted C1 to C20 alkyleneoxy group, a substituted or unsubstituted C1 to C20 fluoroalkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C6 to C20 aryleneoxy group, a substituted or unsubstituted C2 to C20 heteroarylene group, a substituted or unsubstituted C2 to C20 alkenylene group, a substituted or unsubstituted C2 to C20 alkynylene group, and a substituted or unsubstituted C1 to C20 amide group,

*(1) denotes a link to silicon, and *(2) denotes a link to another unit of the polymer.

The anhydride-derived functional group of the above Chemical Formula 4 includes a functional group represented by the following Chemical Formula 4-1.

[Chemical Formula 4-1]

In Chemical Formula 4-1, *(1) denotes a link to silicon, and *(2) denotes a link to another unit of the polymer.

The polymer may be a cross-linked polymer.

The structural unit of Chemical Formula 1 can be located at a main chain or a side chain of the polymer.

The structural unit represented by the above Chemical Formula 1 may be included in an amount of about 0.1 mol % to about 50 mol % of the polymer.

The polymer may include about 14 mol % to about 100 mol % of the anhydride-derived functional group represented by the above Chemical Formula 3 or Chemical Formula 4 based on the total number of $R_a$ and $R_b$ groups included in the polymer.

The polymer including the structural unit represented by Chemical Formula 1 is obtained from polymerization of a monomer composition including monomers for synthesizing a polymer, a silane compound represented by the following Chemical Formula 5, and a silane compound represented by the following Chemical Formula 6.

[Chemical Formula 5]

In Chemical Formula 5, $R_1$, $R_2$, $R_3$, $R'_1$, $R'_2$, and $R'_3$ are each independently the same as $R_1$, $R_2$, and $R_3$ in Chemical Formula 2, and L is the same as L in Chemical Formula 1.

[Chemical Formula 6]

In Chemical Formula 6, $R_5$, $R_6$, and $R_7$ are the same or different, and are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group, and A is an anhydride-derived functional group of the above Chemical Formula 3 or Chemical Formula 4.

The silane compounds represented by the above Chemical Formulae 5 and 6 may be included in an amount about 0.1 mol % to about 50 mol % based on the total moles of the monomers for synthesizing a polymer and silane compounds in the composition.

The silane compound represented by the above Chemical Formula 5 may be used in an amount of about 0.1 wt % to about 99.9 wt % based on the total weight of the composition. The silane compound represented by the above Chemical Formula 6 may be used in an amount of about 99.9 wt % to about 0.1 wt % based on the total weight of the silane compounds in the composition.

The polymer including the structural unit represented by Chemical Formula 1 may be obtained from polymerization of a monomer composition including monomers for synthesizing a polymer, a silane compound represented by the above Chemical Formula 5, a silane compound represented by the above Chemical Formula 6, and a silane compound represented by the following Chemical Formula 7.

[Chemical Formula 7]

In Chemical Formula 7, $R_8$ is selected from hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted C2 to C15 heteroaryl group, a substituted or unsubstituted C2 to C15 alkenyl group, and a substituted or unsubstituted C2 to C15 alkynyl group, and $R_9$, $R_{10}$, and $R_{11}$ are the same or different, and are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group.

The silane compound represented by the above Chemical Formula 7 may be used in an amount of about 0.1 parts by weight to about 100 parts by weight based on 100 parts by weight of the silane compound of Chemical Formula 5.

In addition to the structural units represented by Chemical formula 1, the polymer contains other polymer units. The other polymer units may be selected from polyamic acid units, polyimide units, polyaramid units, polyamide units, polyurethane units, polycarbonate units, polyacetal units, and a combination comprising at least one of the foregoing.

According to another aspect of this disclosure, a film including the polymer is provided.

The film may have a coefficient of thermal expansion ("CTE") ranging from about 10 parts per million per degree Celsius (ppm/° C.) to about 50 ppm/° C., a yellow index ranging from about 2.0 to about 7.0, and light transmittance ranging from about 80% to about 94%.

Hereinafter, further embodiments will be described in further detail.

BRIEF DESCRIPTION OF THE DRAWINGS

The above and other aspects, advantages, and features of this disclosure will become more apparent by describing in further detail exemplary embodiments thereof with reference to the accompanying drawings, in which.

DETAILED DESCRIPTION

This disclosure will be described more fully hereinafter with reference to the accompanying drawings, in which various embodiments are shown. This disclosure may, however, be embodied in many different forms and should not be construed as limited to the exemplary embodiments set forth herein. Rather, these embodiments are provided so that this disclosure will be thorough and complete and will fully convey the scope of the invention to those skilled in the art.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, the term "substituted" refers to a compound or a group substituted with a at least one (e.g., 1, 2, 3, or 4) substituent independently selected from a C1 to C10 alkoxy group, a carboxyl group (—COOH), a C1 to C10 linear or branched alkyl group, a C2 to C10 linear or branched alkenyl group, a C2 to C10 linear or branched alkynyl group, a C3 to C10 cycloalkyl group, a C3 to C10 cycloalkenyl group, a C3 to C10 cycloalkynyl group, a C2 to C10 heterocycloalkyl group, a C2 to C10 heterocycloalkenyl group, a C2 to C10 heterocycloalkynyl group, a C6 to C20 aryl group, and a C2 to C20 heteroaryl group, provided that the substituted atom's normal valence is not exceeded.

The term "alkyl" as used herein refers to a straight or branched chain saturated aliphatic hydrocarbon. Alkyl groups include, for example, groups having from 1 to 15 carbon atoms. An "alkenyl" as used herein is a straight or branched chain hydrocarbon that includes at least one carbon-carbon double bond, and the term "alkynyl" refers to a straight or branched chain hydrocarbon that has one or more unsaturated carbon-carbon bonds, at least one of which is a triple bond. The alkenyl group and alkynyl group may be a C2 to C15 alkenyl group or a C2 to C15 alkynyl group, respectively.

The term "alkylene" as used herein refers to a straight or branched chain divalent saturated aliphatic hydrocarbon group. The term "alkenylene" refers to a straight or branched chain divalent hydrocarbon that includes at least one carbon-carbon double bond.

"Fluoroalkyl" as used herein refers to an alkyl group in which at least one hydrogen is replaced with fluorine.

The term "cycloalkyl" as used herein refers to a group that includes one or more saturated rings, such as cyclopropyl, cyclobutyl, cyclopentyl, cyclohexyl, cycloheptyl, cyclooctyl, and adamantyl. The terms "cycloalkenyl group" and "cycloalkynyl group" as used herein include at least one partially unsaturated ring (i.e., the cycloalkenyl group includes at least one double bond, and the cycloalkenyl group includes at least one triple bond), for example, cyclohexenyl. The cycloalkyl group, cycloalkenyl group, and cycloalkynyl group do not include an aromatic ring or a heterocyclic ring. When numbers of carbon atoms are recited, for example, a C3 to C10 cycloalkyl, these numbers indicate the number of ring members.

The term "cycloalkyloxy group" as used herein refers to a cycloalkyl group as described above that is linked via an oxygen (e.g., —O-cycloalkyl).

The term "alkoxy group" as used herein refers to an alkyl group that is linked via an oxygen (e.g., —O-alkyl).

A "C1 to C30 amide group" as used herein refers to a group of the formula —C(O)—N($R_x$)— or —N($R_x$)—C(O)—, wherein $R_x$ is hydrogen, a C1 to C30 alkyl group, a C2 to C29 alkenyl group, a C2 to C29 alkynyl group, a C3 to C29 cycloalkyl group, or a C6 to C29 aryl group.

The term "C1 to C15 amine group" as used herein refers to a group of the formula —N($R_w$)($R_z$), wherein $R_q$ is a C1 to C15 alkyl group, a C1 to C15 alkenyl group, a C1 to C15 alkynyl group, a C3 to C15 cycloalkyl group, or a C6 to C15 aryl group; and $R_z$ is independently hydrogen or any of the groups listed for $R_w$, such that the total number of carbon atoms in $R_W$ and $R_z$ is from 1 to 15.

The term "C1 to C15 alkyleneamine group" as used herein refers to a group of the formula -Q-N($R_w$)($R_z$), wherein Q is a C1 to C15 alkylene group, and $R_W$ and $R_z$ are each independently hydrogen, a C1 to C14 alkyl group, a C1 to C14 alkenyl group, a C1 to C14 alkynyl group, a C3 to C14 cycloalkyl group, or a C6 to C14 aryl group, such that the total number of carbon atoms in Q, $R_w$, and $R_z$ is from 1 to 15. Accordingly, a "C1 to C15 alkenyleneamine group" as used herein refers to a group of the formula of the formula -Q-N($R_w$)($R_z$), wherein Q is a C1 to C15 alkenylene group, and $R_w$ and $R_z$ are as defined above in this paragraph, such that the total number of carbon atoms in Q, $R_w$, and $R_z$ is from 1 to 15.

The term "alkyleneoxy group" as used herein refers to —O-Q-, wherein Q is a C1 to C30 alkylene or specifically a C2 to C20 alkylene.

The term "aryl group" as used herein refers to a cyclic moiety in which all ring members are carbon and at least one ring is an aromatic ring. More than one ring may be present, and any additional rings may be independently aromatic, saturated, or partially unsaturated, and may be fused, pendant, spirocyclic, or a combination thereof. The term "aryloxy group" as used herein refers to an aryl group that is linked via an oxygen (e.g., —O-aryl).

Throughout the present disclosure, the prefix "hetero" refers to a group that includes at least one member that is a heteroatom (e.g., 1, 2, or 3 heteroatoms that are independently N, O, S, P, or Si).

An asterisk (i.e., "*") denotes a point of attachment, e.g., a link to another atom. The link may be a single bond.

According to an embodiment, a polymer including a structural unit represented by the following Chemical Formula 1 is provided.

Chemical Formula 1

In Chemical Formula 1, n and each m are the same or different, and each independently range from about 4 to about 12, and may be, for example, 4, 6, 8, 10, or 12, k is an integer ranging from 1 to 10,

L is a selected from a substituted or unsubstituted C1 to C30 alkylene group, specifically a substituted or unsubstituted C1 to C12 alkylene group, or more specifically a substituted or unsubstituted C1 to C6 alkylene group; a substituted or unsubstituted C1 to C30 alkyleneoxy group, specifically a substituted or unsubstituted C1 to C12 alkyleneoxy group, or more specifically a substituted or unsubstituted C1 to C6 alkyleneoxy group; a substituted or unsubstituted C1 to C30 fluoroalkylene group, specifically a substituted or unsubstituted C1 to C12 fluoroalkylene group, or more specifically a substituted or unsubstituted C1 to C6 fluoroalkylene group; a substituted or unsubstituted C3 to C30 cycloalkylene group, specifically a substituted or unsubstituted C3 to C24 cycloalkylene group, or more specifically a substituted or unsubstituted C3 to C12 cycloalkylene group; a substituted or unsubstituted C3 to C30 heterocycloalkylene group, a substituted or unsubstituted C3 to C20 heterocycloalkylene group, or more specifically a substituted or unsubstituted C3 to C12 heterocycloalkylene group; a substituted or unsubstituted C6 to C30 arylene group, specifically a substituted or unsubstituted C6 to C20 arylene group, or more specifically a substituted or unsubstituted C6 to C12 arylene group; a substituted or unsubstituted C6 to C30 aryleneoxy group, specifically a substituted or unsubstituted C6 to C20 aryleneoxy group, or more specifically a substituted or unsubstituted C6 to C12 aryleneoxy group; a substituted or unsubstituted C2 to C30 heteroarylene group, specifically a substituted or unsubstituted C2 to C20 heteroarylene group, or more specifically a substituted or unsubstituted C2 to C12 heteroarylene group; a substituted or unsubstituted C2 to C30 alkenylene group, specifically a substituted or unsubstituted C2 to C20 alkenylene group, or more specifically a substituted or unsubstituted C2 to C12 alkenylene group; a substituted or unsubstituted C2 to C30 alkynylene group, specifically a substituted or unsubstituted C2 to C20 alkynylene group, or more specifically a substituted or unsubstituted C2 to C12 alkynylene group; and a substituted or unsubstituted C1 to C30 amide group, specifically a substituted or unsubstituted C1 to C20 amide group, or more specifically a substituted or unsubstituted C1 to C12 amide group, and $R_a$ and $R_b$ are each independently selected from hydrogen; a substituted or unsubstituted C1 to C15 alkyl group, specifically a substituted or unsubstituted C1 to C10 alkyl group, or more specifically a substituted or unsubstituted C1 to C4 alkyl group; a substituted or unsubstituted C1 to C15 alkoxy group, specifically a substituted or unsubstituted C1 to C10 alkoxy group, or more specifically a substituted or unsubstituted C1 to C4 alkoxy group; a substituted or unsubstituted C1 to C15 fluoroalkyl group, specifically a substituted or unsubstituted C1 to C10 fluoroalkyl group, or more specifically a substituted or unsubstituted C1 to C4 fluoroalkyl group; a substituted or unsubstituted C3 to C15 cycloalkyl group, specifically a substituted or unsubstituted C4 to C10 cycloalkyl group, or more specifically a substituted or unsubstituted C5 to C8 cycloalkyl group; a substituted or unsubstituted C3 to C15 heterocycloalkyl group, specifically a substituted or unsubstituted C2 to C10 heterocycloalkyl group, or more specifically a substituted or unsubstituted C2 to C4 heterocycloalkyl group; a substituted or unsubstituted C3 to C15 cycloalkyloxy group, specifically a substituted or unsubstituted C4 to C12 cycloalkyloxy group, or more specifically a substituted or unsubstituted C5 to C10 cycloalkyloxy group; a substituted or unsubstituted C6 to C15 aryl group, specifically a substituted or unsubstituted C6 to C14 aryl group, or more specifically a substituted or unsubstituted C6 to C12 aryl group; a substituted or unsubstituted C6 to C15 an aryloxy group, specifically a substituted or unsubstituted C6 to C14 aryloxy group, or more specifically a substituted or unsubstituted C6 to C12 aryloxy group; a substituted or unsubstituted C2 to C15 heteroaryl group, specifically a substituted or unsubstituted C2 to C10 heteroaryl group, or more specifically a substituted or unsubstituted C2 to C8 heteroaryl group; a substituted or unsubstituted C2 to C15 alkenyl group, specifically a substituted or unsubstituted C2 to C10 alkenyl group, or more specifically a substituted or unsubstituted C2 to C8 alkenyl group; a substituted or unsubstituted C2 to C15 alkynyl group, specifically a substituted or unsubstituted C2 to C10 alkynyl group, or more specifically a substituted or unsubstituted C2 to C8 alkynyl group; $NH_2$; a substituted or unsubstituted C1 to C15 amine group, specifically a substituted or unsubstituted C1 to is C10 amine group, or more specifically a substituted or unsubstituted C1 to C8 amine group; a substituted or unsubstituted C1 to C15 alkyleneamine group, specifically a substituted or unsubstituted C1 to C10 alkyleneamine group, or more specifically a substituted or unsubstituted C1 to C8 alkyleneamine group; a substituted or unsubstituted C6 to C15 aryleneamine group, specifically a substituted or unsubstituted C6 to C12 aryleneamine group, or more specifically a substituted or unsubstituted C6 to C10 aryleneamine group; a substituted or unsubstituted C1 to C15 alkenyleneamine group, specifically a substituted or unsubstituted C1 to C6 alkenyleneamine group, or more specifically a substituted or unsubstituted C1 to C4 alkenyleneamine group; and a functional group represented by the following Chemical Formula 2, provided that at least one of $R_a$ and $R_b$ is an anhydride-derived functional group represented by the following Chemical Formula 3 or Chemical Formula 4.

[Chemical Formula 2]

In Chemical Formula 2, $R_1$, $R_2$, and $R_3$ are the same or different, and are each independently selected from hydrogen; a substituted or unsubstituted C1 to C15 alkyl group, specifically a substituted or unsubstituted C1 to C10 alkyl group, or more specifically a substituted or unsubstituted C1 to C4 alkyl group; a substituted or unsubstituted C1 to C15 fluoroalkyl group, specifically a substituted or unsubstituted C1 to C10 fluoroalkyl group, or more specifically a substituted or unsubstituted C1 to C4 fluoroalkyl group; a substituted or unsubstituted C3 to C15 cycloalkyl group, specifically a substituted or unsubstituted C4 to C10 cycloalkyl group, or more specifically a substituted or unsubstituted C5 to C8 cycloalkyl group; a substituted or unsubstituted C3 to C15 heterocycloalkyl group, specifically a substituted or unsubstituted C3 to C10 heterocycloalkyl group, or more specifically a substituted or unsubstituted C3 to C6 heterocycloalkyl group; a substituted or unsubstituted C6 to C15 aryl group, specifically a substituted or unsubstituted C6 to C14 aryl group, or more specifically a substituted or unsubstituted C6 to C12 aryl group; a substituted or unsubstituted C2 to C15 heteroaryl group, specifically a substituted or unsubstituted C2 to C10 heteroaryl group, or more specifically a substituted or unsubstituted C2 to C8 heteroaryl group; a substituted or unsubstituted C2 to C15 alkenyl group, specifically a substituted or unsubstituted C2 to C10 alkenyl group, or more specifically a substituted or unsubstituted C2 to C8 alkenyl group; and a substituted or unsubstituted C2 to C15 alkynyl group, specifically a substituted or unsubstituted C2 to C10 alkynyl group, or more specifically a substituted or unsubstituted C2 to C8 alkynyl group.

[Chemical Formula 3]

In Chemical Formula 3,

$R_c$ is selected from a substituted or unsubstituted C1 to C20 alkylene group, specifically a substituted or unsubstituted C1 to C18 alkylene group, or more specifically a substituted or unsubstituted C1 to C16 alkylene group; a substituted or unsubstituted C1 to C20 alkyleneoxy group, specifically a substituted or unsubstituted C1 to C18 alkyleneoxy group, or more specifically a substituted or unsubstituted C1 to C16 alkyleneoxy group; a substituted or unsubstituted C1 to C20 fluoroalkylene group, specifically a substituted or unsubstituted C1 to C18 fluoroalkylene group, or more specifically a substituted or unsubstituted C1 to C16 fluoroalkylene group; a substituted or unsubstituted C3 to C20 cycloalkylene group, specifically a substituted or unsubstituted C3 to C18 cycloalkylene group, or more specifically a C3 to C16 cycloalkylene group; a substituted or unsubstituted C3 to C20 heterocycloalkylene group, specifically a substituted or unsubstituted C3 to C18 heterocycloalkylene group, or more specifically a C3 to C16 heterocycloalkylene group; a substituted or unsubstituted C6 to C20 arylene group, specifically a substituted or unsubstituted C6 to C16 arylene group, or more specifically a C3 to C12 arylene group; a substituted or unsubstituted C6 to C20 aryleneoxy group, specifically a substituted or unsubstituted C6 to C16 aryleneoxy group, or more specifically a C3 to C12 aryleneoxy group; a substituted or unsubstituted C2 to C20 heteroarylene group, specifically a substituted or unsubstituted C2 to C16 heteroarylene group, or more specifically a C2 to C12 heteroarylene group; a substituted or unsubstituted C2 to C20 alkenylene group, specifically a substituted or unsubstituted C2 to C16 alkenylene group, or more specifically a C2 to C12 alkenylene group; a substituted or unsubstituted C2 to C20 alkynylene group, specifically a substituted or unsubstituted C2 to C16 alkynylene group, or more specifically a C2 to C12 alkynylene group; and a substituted or unsubstituted C1 to C20 amide group, specifically a substituted or unsubstituted C1 to C16 amide group, or more specifically a C1 to C12 amide group;

$R_d$ is selected from a substituted or unsubstituted C1 to C15 alkyl group, specifically a substituted or unsubstituted C1 to C13 alkyl group, or more specifically a C1 to C11 alkyl group; a substituted or unsubstituted C1 to C15 fluoroalkyl group, specifically a substituted or unsubstituted C1 to C13 fluoroalkyl group, or more specifically a C1 to C11 fluoroalkyl group; a substituted or unsubstituted C3 to C10 cycloalkyl group, specifically a substituted or unsubstituted C3 to C8 cycloalkyl group, or more specifically a C3 to C6 cycloalkyl group; a substituted or unsubstituted C2 to C10 heterocycloalkyl group, specifically a substituted or unsubstituted C2 to C8 heterocycloalkyl group, or more specifically a C2 to C6 heterocycloalkyl group; a substituted or unsubstituted C6 to C20 aryl group, specifically a substituted or unsubstituted C6 to C16 aryl group, or more specifically a C6 to C12 aryl group; and a substituted or unsubstituted C2 to C20 heteroaryl group specifically a substituted or unsubstituted C6 to C16 heteroaryl group, or more specifically a C6 to C12 heteroaryl group,

*(1) denotes link to silicon, and *(2) denotes a link to another unit of the polymer.

[Chemical Formula 4]

In Chemical Formula 4,

$R_e$ is a substituted or unsubstituted C2 to C10 alkylene group, specifically a substituted or unsubstituted C2 to C8 alkylene group, or more specifically a C2 to C6 alkylene group, $R_f$ is selected from a single bond, a substituted or unsubstituted C1 to C20 alkylene group, specifically a substituted or unsubstituted C2 to C18 alkylene group, or more specifically a C2 to C16 alkylene group, for example a propylene or butylene group, a substituted or unsubstituted C1 to C20 alkyleneoxy group, specifically a substituted or unsubstituted C2 to C18 alkyleneoxy group, or more specifically a C2 to C16 alkyleneoxy group; a substituted or unsubstituted C1 to C20 fluoroalkylene group, specifically a substituted or unsubstituted C1 to C18 fluoroalkylene group, or more specifically a C1 to C16 fluoroalkylene group; a substituted or unsubstituted C3 to C20 cycloalkylene group, specifically a substituted or unsubstituted C3 to C18 cycloalkylene group, or more specifically a C3 to C16 cycloalkylene group; a substituted or unsubstituted C3 to C20 heterocycloalkylene group, specifically a substituted or unsubstituted C3 to C18 heterocycloalkylene group, or more specifically a C3 to C16 heterocycloalkylene group; a substituted or unsubstituted C6 to C20 arylene group, specifically a substituted or unsubstituted C6 to C16 arylene group, or more specifically a C6 to C12 arylene group; a substituted or unsubstituted C6 to C20 aryleneoxy group, specifically a substituted or unsubstituted C6 to C16 aryleneoxy group, or more specifically a C6 to C12 aryleneoxy group; a substituted or unsubstituted C2 to C20 heteroarylene group, specifically a substituted or unsubstituted C6 to C16 heteroarylene group, or more specifically a C6 to C12 heteroarylene group; a substituted or unsubstituted C2 to C20 alkenylene group, specifically a substituted or unsubstituted C2 to C16 alkenylene group, or more specifically a C2 to C12 alkenylene group; a substituted or unsubstituted C2 to C20 alkynylene group, specifically a substituted or unsubstituted C2 to C16 alkynylene group, or more specifically a C2 to C12 alkynylene group; and a substituted or unsubstituted C1 to C20 amide group, specifically a substituted or unsubstituted C1 to C16 amide group, or more specifically a substituted or unsubstituted C1 to C12 amide group,

*(1) denotes a link to silicon, and *(2) denotes a link to another unit of the polymer.

The anhydride-derived functional group of the above Chemical Formula 4 includes a functional group represented by the following Chemical Formula 4-1.

[Chemical Formula 4-1]

In Chemical Formula 4-1, *(1) denotes a link to silicon, and *(2) denotes a link to another unit of the polymer.

In the above Chemical Formula 1, n and m each independently range from 4 to 12. When n and m are 4, $(R_a)_{n-2}(SiO_{1.5})_n$ or $(R_b)_{m-2}(SiO_{1.5})_m$ forms a random branched structure individually, and when n and m are 6, $(R_a)_{n-2}(SiO_{1.5})_n$ or $(R_b)_{m-2}(SiO_{1.5})_m$ forms a cage or partial cage structure individually. When n and m are greater than 8, $(R_a)_{n-2}(SiO_{1.5})_n$ or $(R_b)_{m-2}(SiO_{1.5})_m$ forms a cage structure individually.

The structural unit represented by the above Chemical Formula 1 may be included in an amount of about 0.1 mol % to about 50 mol % based on the total amount of the polymer. In another embodiment, the structural unit represented by the above Chemical Formula 1 may be included in an amount of about 0.1 mol % to about 25 mol % based on the total amount of the polymer. In still another embodiment, the structural unit represented by the above Chemical Formula 1 may be included in an amount of about 0.1 mol % to about 10 mol % based on the total amount of the polymer. When the structural unit represented by the above Chemical Formula 1 is included within these ranges, a film comprising the polymer may have improved thermal and optical properties and mechanical properties.

The polymer including the structural unit represented by Chemical Formula 1 may have a coefficient of thermal expansion ranging from about 10 parts per million per degree Celsius (ppm/° C.) to about 100 ppm/° C. In addition, the structural unit represented by Chemical Formula 1 may be present in a polymer having a cross-linked structure and impart improved mechanical properties of a film comprising the cross-linked polymer.

The polymer may include about 14 mol % to about 100 mol % of an anhydride-derived functional group represented by the above Chemical Formula 3 or 4 based on the total number of $R_a$ and $R_b$ groups included in the polymer. In another embodiment, the polymer may include about 20 mol % to about 50 mol % of the anhydride-derived functional group represented by the above Chemical Formula 3 or 4 based on the total number of $R_a$ and $R_b$ groups included in the polymer. When the anhydride-derived functional group of Chemical Formula 3 or 4 is included within the range, miscibility and compatibility with the main chain of the polymer may be improved.

The polymer including the structural unit represented by Chemical Formula 1 may be prepared by polymerizing a monomer composition that includes monomers for synthesizing a polymer as described in more detail below, and silane compounds represented by the following Chemical Formulae 5 and 6, and optionally Formula 7. The reaction may be performed under conditions effective to produce the polymer including the structural unit represented by Chemical Formula 1, and thus will vary depending on the other structural units of the polymer. Such conditions may be generally determined by one of skill in the art without undue experimentation, based on the type of other structural units, and compatibility with incorporation of silane compounds of the following Chemical Formulae 5 and 6 and optionally Formula 7. For example, such reactions may be performed in a protic solvent (e.g., water, methanol, ethanol, 2-methyl-1-butanol, 2-methyl-2-butanol or the like), or an aprotic solvent, in particular, a polar aprotic solvent (e.g., N,N-dimethyl acetamide, N,N-dimethyl formamide, N-methylformamide, N-methyl-2-pyrrolidone, dimethylsulfoxide, tetrahydrofuran, γ-butyrolactone, cyclohexanone, 3-hexanone, 3-heptanone, 3-octanone, acetone, methyl ethyl ketone and the like). A combination of solvents can be used.

The reaction is performed at a temperature and for a time effective to form the polymer, such about 0° C. to about 120° C., for about 1 minute to about 12 hours. However, in a significant advantage, the polymer including the structural unit represented by Chemical Formula 1 can be produce at very moderate temperatures in short times, for example at a temperature of about 0° C. for about 1 hour or less (e.g., about 10 minutes or less) and optionally by further performing the reaction at a high temperature for more than one hour or more (e.g. about 65° C. for about 5 hours).

[Chemical Formula 5]

In Chemical Formula 5, $R_1$, $R_2$, $R_3$, $R'_1$, $R'_2$, and $R'_3$ are each independently the same as $R_1$, $R_2$, and $R_3$ in Chemical Formula 2, and L is the same as L in Chemical Formula 1.

[Chemical Formula 6]

In Chemical Formula 6, $R_5$, $R_6$, and $R_7$ are each independently selected from hydrogen; a substituted or unsubstituted C1 to C15 alkyl group, specifically a substituted or unsubstituted C1 to C10 alkyl group, or more specifically a substituted or unsubstituted C1 to C4 alkyl group; a substituted or unsubstituted C1 to C15 fluoroalkyl group, specifically a substituted or unsubstituted C1 to C10 fluoroalkyl group, or more specifically a substituted or unsubstituted C1 to C4 fluoroalkyl group; a substituted or unsubstituted C3 to C15 cycloalkyl group, specifically a substituted or unsubstituted C4 to C10 cycloalkyl group, or more specifically a substituted or unsubstituted C5 to C8 cycloalkyl group; a substituted or unsubstituted C3 to C15 heterocycloalkyl group, specifically a substituted or unsubstituted C2 to C10 heterocycloalkyl group, or more specifically a substituted or unsubstituted C2 to C4 heterocycloalkyl group; a substituted or unsubstituted C6 to C15 aryl group, specifically a substituted or unsubstituted C6 to C14 aryl group, or more specifically a substituted or unsubstituted C6 to C12 aryl group; a substituted or unsubstituted C2 to C15 heteroaryl group, specifically a substituted or unsubstituted C2 to C10 heteroaryl group, or more specifically a substituted or unsubstituted C2 to C8 heteroaryl group; a substituted or unsubstituted C2 to C15 alkenyl group, specifically a substituted or unsubstituted C2 to C10 alkenyl group, or more specifically a substituted or unsubstituted C2 to C8 alkenyl group; and a substituted or unsubstituted C2 to C15 alkynyl group, specifically a substituted or unsubstituted C2 to C10 alkynyl group, or more specifically a substituted or unsubstituted C2 to C8 alkynyl group, and A is an anhydride-derived functional group represented by the above Chemical Formula 3 or 4.

The silane compounds represented by the above Chemical Formulae 5 and 6 may be used in an amount of about 0.1 mol % to about 50 mol %, specifically about 0.1 mol % to about 40 mol %, and more specifically about 0.1 mol % to about 30 mol % based on the total amount of the monomers for synthesizing a polymer and the silane compounds represented by the above Chemical Formulae 5 and 6 in the composition.

The silane compound represented by the above Chemical Formula 5 may be used in an amount of about 0.1 wt % to about 99.9 wt % based on the weight of the composition. The silane compound represented by the above Chemical Formula 6 may be used in an amount of about 99.9 wt % to about 0.1 wt % based on the weight of the composition. According to another embodiment, the silane compound represented by the above Chemical Formula 5 may be used in an amount of about 20 wt % to about 50 wt % based on the weight of the composition, and the silane compound represented by the above Chemical Formula 6 may be used in an amount of about 80 wt % to about 50 wt % based on the weight of the composition. When the silane compounds are used within these ranges, an anhydride-derived functional group in an organic compound represented by the above Chemical Formula 1 may be adjusted to an amount and a number average molecular weight ("Mn") within a desired range.

The polymer including the structural unit represented by Chemical Formula 1 may be obtained by polymerization of a composition including monomers for synthesizing a polymer, a silane compound represented by the above Chemical Formula 5, a silane compound represented by the above Chemical Formula 6, and a silane compound represented by the following Chemical Formula 7.

[Chemical Formula 7]

In Chemical Formula 7, $R_8$ is selected from hydrogen; a substituted or unsubstituted C1 to C15 alkyl group, specifically a substituted or unsubstituted C1 to C10 alkyl group, or more specifically a substituted or unsubstituted C1 to C4 alkyl group; a substituted or unsubstituted C1 to C15 alkoxy group, specifically a substituted or unsubstituted C1 to C10 alkoxy group, or more specifically a substituted or unsubstituted C1 to C4 alkoxy group; a substituted or unsubstituted C1 to C15 fluoroalkyl group, specifically a substituted or unsubstituted C1 to C10 fluoroalkyl group, or more specifically a substituted or unsubstituted C1 to C4 fluoroalkyl group; a substituted or unsubstituted C3 to C15 cycloalkyl group, specifically a substituted or unsubstituted C4 to C10 cycloalkyl group, or more specifically a substituted or unsubstituted C5 to C8 cycloalkyl group; a substituted or unsubstituted C2 to C15 heterocycloalkyl group, specifically a substituted or unsubstituted C2 to C10 heterocycloalkyl group, or more specifically a substituted or unsubstituted C2 to C4 heterocycloalkyl group; a substituted or unsubstituted C3 to C15 cycloalkyloxy group, specifically a substituted or unsubstituted C4 to C12 cycloalkyloxy group, or more specifically a substituted or unsubstituted C5 to C10 cycloalkyloxy group; a substituted or unsubstituted C6 to C15 aryl group, specifically a substituted or unsubstituted C6 to C14 aryl group, or more specifically a substituted or unsubstituted C6 to C12 aryl group; a substituted or unsubstituted C6 to C15 aryloxy group, specifically a substituted or unsubstituted C6 to C14 aryloxy group, or more specifically a substituted or unsubstituted C6 to C12 aryloxy group; a substituted or unsubstituted C2 to C15 heteroaryl group, specifically a substituted or unsubstituted C2 to C10 heteroaryl group, or more specifically a substituted or unsubstituted C2 to C8 heteroaryl group; a substituted or unsubstituted C2 to C15 alkenyl group, specifically a substituted or unsubstituted C2 to C10 alkenyl group, or more specifically a substituted or unsubstituted C2 to C8 alkenyl group; and a substituted or unsubstituted C2 to C15 alkynyl group, specifically a substituted or unsubstituted C2 to C10 alkynyl group, or more specifically a substituted or unsubstituted C2 to C8 alkynyl group, and $R_9$, $R_{10}$, and $R_{11}$ are each independently selected from hydrogen; a substituted or unsubstituted C1 to C15 alkyl group, specifically a substituted or unsubstituted C1 to C10 alkyl group, or more specifically a substituted or unsubstituted C1 to C4 alkyl group; a substituted or unsubstituted C1 to C15 fluoroalkyl group, specifically a substituted or unsubstituted C1 to C10 fluoroalkyl group, or more specifically a substituted or unsubstituted C1 to C4 fluoroalkyl group; a substituted or unsubstituted C3 to C15 cycloalkyl group, specifically a substituted or unsubstituted C4 to C10 cycloalkyl group, or more specifically a substituted or unsubstituted C5 to C8 cycloalkyl group; a substituted or unsubstituted C2 to C15 heterocycloalkyl group, specifically a substituted or unsubstituted C2 to C10 heterocycloalkyl group, or more specifically a substituted or unsubstituted C2 to C4 heterocycloalkyl group; a substituted or unsubstituted C6 to C15 aryl group, specifically a substituted or unsubstituted C6 to C14 aryl group, or more specifically a substituted or unsubstituted C6 to C12 aryl group; a substituted or unsubstituted C2 to C15 heteroaryl group, specifically a substituted or unsubstituted C2 to C10 heteroaryl group, or more specifically a substituted or unsubstituted C2 to C8 heteroaryl group; a substituted or unsubstituted C2 to C15 alkenyl group, specifically a substituted or unsubstituted C2 to C10 alkenyl group, or more specifically a substituted or unsubstituted C2 to C8 alkenyl group; or and a substituted or unsubstituted C2 to C15 alkynyl group, specifically a substituted or unsubstituted C2 to C10 alkynyl group, or more specifically a substituted or unsubstituted C2 to C8 alkynyl group.

The silane compound represented by the above Chemical Formula 7 may be included in an amount of about 0.1 parts by weight to about 100 parts by weight based on 100 parts by weight of the silane compound represented by Chemical Formula 5. When the silane compound represented by Chemical Formula 7 is used within the this range, a polymer including the structural unit represented by Chemical Formula 1 may include an anhydride-derived functional group within a predetermined weight range and weight average molecular weight (Mn).

The polymer further includes structural polymer units other than the structural units represented by Chemical Formula 1. These other structural units may be any known in the art, provided that the monomer units used to form the other polymer units can form bonds to the structural units of Chemical Formula I. Such monomers include monomers and oligomers having amino functional groups, hydroxyl functional groups, carboxylic acid, carboxylic ester, carboxylic anhydride, or carboxylic halide functional groups, amide functional groups, aldehyde functional groups, isocyanate functional groups. In an embodiment, the polymer further includes structural units selected from polyamic acid units, polyimide units, polyaramid units, polyamide units, polyurethane units, polyester units, polycarbonate units, polyacetal units, and a combination of at least one of the foregoing.

A silane compound or silsesquioxane-based silane compound that differs from the compounds and polymers described herein may be added to the organic polymer described herein and used as a filler to improve physical properties of the polymer including a structure unit of Chemical Formula I. However, since a free alkyl group at a terminal position may have high mobility, the coefficient of thermal expansion may be increased, thereby potentially deteriorating the thermal properties of a polymer film.

According to an embodiment, an organic silicon structural unit of Chemical Formula 1 including two or more silsesquioxanes connected through a hydrocarbon group (L) may be introduced into a main chain or side chain of a polymer to improve physical properties of the polymer. In an embodiment, the polymer is cross-linked via the two or more silsesquioxanes connected through a hydrocarbon group (L). Without being bound by theory, introduction of the organic silicon structural unit of Chemical Formula 1 including two or more silsesquioxanes connected through a hydrocarbon group (L) may decrease the coefficient of thermal expansion by reducing the number of terminal alkyl groups and thus reducing mobility of the terminal groups. In addition, the organic silicon structural unit including an anhydride-derived functional group may further improve optical and mechanical properties. Accordingly, when the polymer is used to fabricate a film, the film may have a lower coefficient of thermal expansion and improved light transmittance.

Thus, in an embodiment, in the polymer including a structural unit represented by Chemical Formula 1, cross-linking may occur via the structural unit of Chemical Formula 1, for example wherein a first silsesquioxane unit is present in one chain of the polymer, and a second silsesquioxane unit linked to the first by linker L is present in another chain of the polymer. Alternatively, the first and second silsesquioxane units linked by linker L can be located in the same chain, with other intervening polymer units between them. The degree of cross-linking will be determined by the relative concentration of the monomers to synthesize the polymer and the silane compounds of Chemical Formulae 5 and 6, as well as reaction conditions.

In another exemplary embodiment, cross-linking may occur via another group in the polymer after synthesis. For example, if one or both of $R_a$ and/or $R_b$ contain ethylenic unsaturation, for example vinyl, allyl, or (meth)acryl groups, the polymer may be cross-linked by reaction of the ethylenic unsaturation, for example by exposure to ultraviolet radiation. The monomers used to synthesize the other polymer units may also be adjusted to provide cross-linking where desired. A combination of different cross-linking mechanisms can be used.

The compounds represented by the above Chemical Formulae 5, 6, and 7 may form a siloxane bond at a low temperature through a hydrolysis reaction and may not need an additional process for forming a siloxane bond when the polymer is synthesized. This siloxane bond may improve mechanical properties of a polymer.

Figure 1:
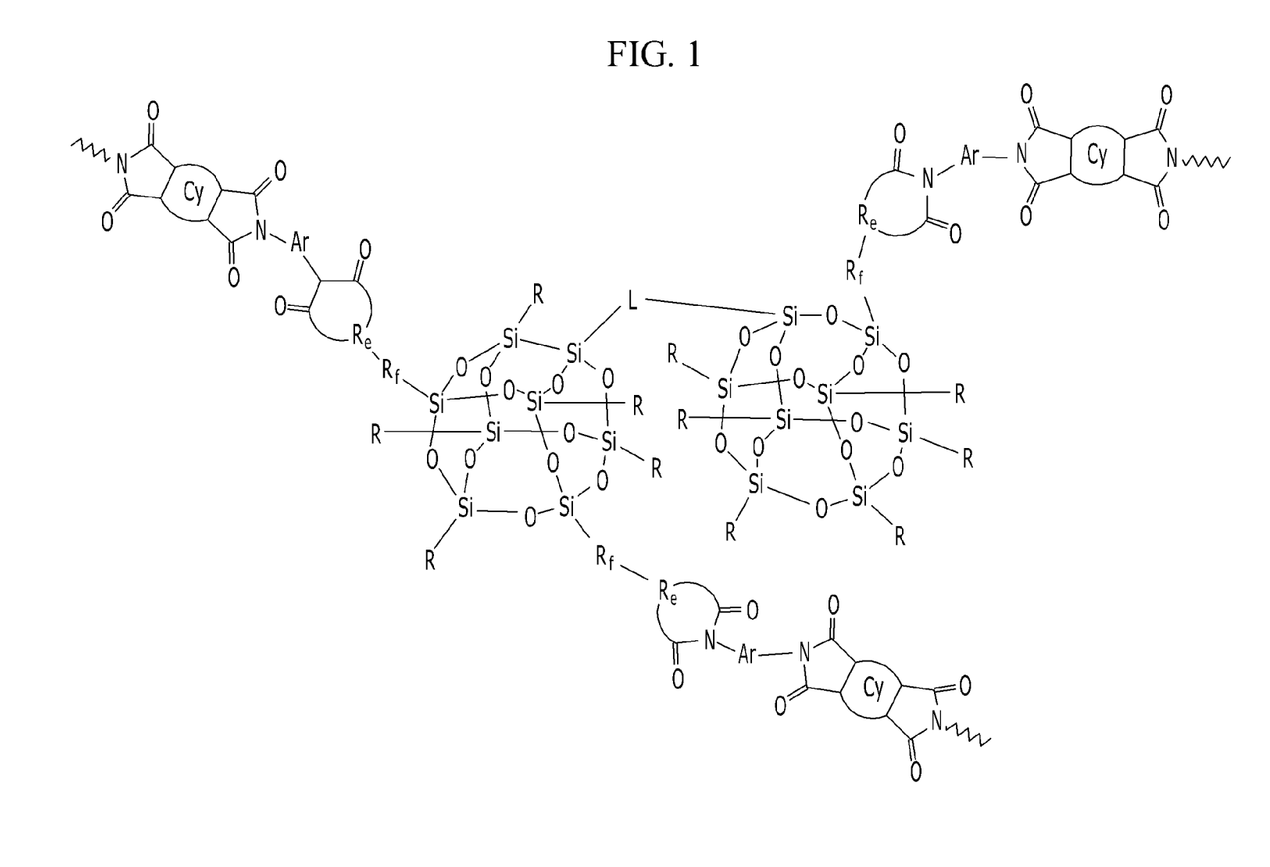
FIG. 1 is a chemical structure of an exemplary embodiment of a polymer.

When the polymer is polyimide, the anhydride-derived functional group is represented by Chemical Formula 4, n and m are 8 in Chemical Formula 1, and k is 1, and an exemplary embodiment of a final polymer is represented by the structure shown in FIG. 1.

In the structure shown in FIG. 1,

Cy is a functional group selected from a substituted or unsubstituted C4 to C20 carbocyclic group, specifically a substituted or unsubstituted C4 to C20 carbocyclic group, or more specifically a substituted or unsubstituted C4 to C20 carbocyclic group; a substituted or unsubstituted C6 to C20 monocyclic aromatic group, or specifically a substituted or unsubstituted C6 to C12 monocyclic aromatic group; a substituted or unsubstituted C2 to C20 condensed polycyclic aromatic group, specifically a substituted or unsubstituted C4 to C16 condensed polycyclic aromatic group, or more specifically a substituted or unsubstituted C4 to C12 condensed polycyclic aromatic group; and a C6 to C20 non-condensed polycyclic aromatic group including a linker that is a substituted or unsubstituted aromatic group, specifically a substituted or unsubstituted C6 to C16 non-condensed polycyclic aromatic group including a linker that is a substituted or unsubstituted aromatic group, or more specifically a substituted or unsubstituted C6 to C12 non-condensed polycyclic aromatic group including a linker that is a substituted or unsubstituted aromatic group, Ar is a substituted or unsubstituted C6 to C20 arylene group, specifically a substituted or unsubstituted C6 to C16 arylene group, or more specifically a substituted or unsubstituted C6 to C12 arylene group;

L is the same as defined in Chemical Formula 1, $R_e$ and $R_f$ are the same as defined in Chemical Formula 4, and R is the same as $R_a$ and $R_b$ in Chemical Formula 1.

When the polymer is synthesized, reactions between the monomers for synthesizing a polymer and the silane compounds represented by Chemical Formulae 5 to 7 have no particular limit to the order. However, when the polymer is polyimide, a diamine compound may be first reacted with a silane compound represented by Chemical Formula 6, dianhydride is added thereto, and then silane compounds represented by Chemical Formulae 5 and 7 are added thereto for reaction.

According to another embodiment of the present invention, a composition including the polymer is provided. In an embodiment, the composition is a film-forming composition.

The composition may further include one or more additives known for use in the formation of films, for example, an antioxidant, an ultraviolet light ("UV") absorber, a thermal stabilizer, and the like. The amount of each additive will depend on the type of additive and its desired function, and may be readily determined by one of ordinary skill in the art without undue experimentation. Generally, each additive is present in the composition in an amount of about 0.01 wt % to about 1 wt %, specifically about 0.01 wt % to about 0.8 wt %, or more specifically about 0.01 wt % to about 0.5 wt % based on the total weight of the composition.

The composition may further include an inorganic material such as a particulate filler, for example, a ceramic such as alumina, beryllia, ceria, zirconia, carbide, boride, nitride, or silicide, a mineral such as calcium carbonate, talc, mica, or kaolin (clay), or a reinforcing filler such as a glass fiber or synthetic fiber. Without being bound by theory, the organic silicone structural units of Chemical Formula I may improve compatibility between the polymer and the inorganic material. The amount of the inorganic material will depend on the type of inorganic material and its desired function, and can be readily determined by one of ordinary skill in the art without undue experimentation. The fillers, for example, can be present in an amount of about 1 wt % to about 50 wt %, specifically about 5 wt % to about 40 wt %, or more specifically about 10 wt % to about 30 wt %, based on the weight of the composition. Reinforcing fillers, for example, can be present in an amount of about 10 wt % to about 80 wt %, specifically about 15 wt % to about 70 wt %, or more specifically about 20 wt % to about 60 wt % based on the weight of the composition.

The composition, particularly when it is a film-forming composition, may further include a solvent, which may enhance its coating performance. Examples of the solvent include dimethylsulfoxide; N-methyl-2-pyrrolidone; N,N-dimethyl formamide (DMF); N,N-dimethyl acetamide (DMAc); N-methylformamide (NMF), or a combination comprising at least one of the foregoing; alcohols including methanol, ethanol, 2-methyl-1-butanol, 2-methyl-2-butanol, or a combination comprising at least one of the foregoing; ketones including γ-butyrolactone, cyclohexanone, 3-hexanone, 3-heptanone, 3-octanone, acetone, methyl ethyl ketone, or a combination comprising at least one of the foregoing; tetrahydrofuran; trichloroethane; or a combination comprising at least one of the foregoing, but are not limited thereto. Such a solvent may be used singularly or in a combination of two or more.

According to another embodiment, a film including the polymer is provided.

The films may be formed by a variety of methods, for example by coating, (e.g., spin coating, flow coating, dip coating, doctor blade coating, brush coating, cup coating, and spray coating), by printing (e.g., microgravure, inkjet, reverse microgravure, comma, slot/die coating, lip coating), and the like. The films may be formed on a substrate or a release layer, depending on the intended use of the film. The thickness of the film is not particularly limited, and can be, for example, about 1 micrometer (µm) to about 5 millimeters (mm), more specifically a thickness of about 5 µm to about 2 mm.

The film includes a polymer including a structural unit represented by Chemical Formula 1 and may have a lower coefficient of thermal expansion and improved light transmittance and yellow index than the same polymer without a structural unit represented by Chemical Formula 1. The film may have a coefficient of thermal expansion (CTE) ranging from about 10 ppm/° C. to about 50 ppm/° C., and in another embodiment from about 10 ppm/° C. to about 30 ppm/° C.; a yellow index ranging from about 2.0 to about 7.0, and in another embodiment from about 2.0 to about 5.0; and light transmittance ranging from about 80% to about 94%, and in another embodiment from about 88% to about 94%.

The film may be applied to a substrate for a device, an optical film, an integrated circuit ("IC") package, an adhesive film, a multi-layered flexible printed circuit ("FPC"), a tape, and the like.

Hereinafter, the embodiments are illustrated in more detail with reference to examples. However, the following are exemplary embodiments and are not limiting.

Example 1

Polymer Synthesis

About 1137 milligrams (mg) of 2,2-bis[4-(3-aminophenoxy)benzene] (m-BAPS) and about 16 mg of 3-(triethoxysilyl)propylsuccinic anhydride (TESSA) are agitated in dimethyl acetamide (DMAc) for about 5 hours in a 500 milliliter (mL) round-bottomed flask, and then 647 mg of bicyclo[2.2.2]oct-7-ene-2,3,5,6-tetracarboxylic dianhydride (BTDA) is added thereto. The mixture is agitated for about 17 hours. Then, about 18 mg of 1,2-bis(triethoxysilylethane) (BTSE), about 7 mg of methyl(trimethoxysilane) (MTMS), and about 40 mg of $H_2O$ are dissolved in DMAc. The resulting solution is added to the round-bottomed flask while it is still being agitated. The resulting mixture is agitated for about 5 hours more, preparing polyamic acid.

Example 2

Polymer Synthesis

About 1132 mg of 2,2-bis[4-(3-aminophenoxy)benzene] (m-BAPS) and about 32 mg of 3-(triethoxysilyl)propylsuccinic anhydride (TESSA) are agitated in dimethyl acetamide (DMAc) for about 5 hours in a 500 mL round-bottomed flask. Then, about 636 mg of bicyclo[2.2.2]oct-7-ene-2,3,5,6-tetracarboxylic anhydride (BTDA) is added to the resulting product. The mixture is agitated for about 17 hours. Next, about 36 mg of 1,2-bis(triethoxysilylethane) (BTSE), about 14 mg of methyl(trimethoxysilane) (MTMS), and about 40 mg of $H_2O$ are dissolved in DMAc. The solution is added to the round-bottomed flask while it is still being agitated. The mixture is agitated for about 5 hours more, acquiring polyamic acid.

Comparative Example 1

Polymer Synthesis

About 657 mg of bicyclo[2.2.2]oct-7-ene-2,3,5,6-tetracarboxylic anhydride (BTDA) and about 1144 mg of 2,2-bis[4-(3-aminophenoxy)benzene] (m-BAPS) are introduced into a 500 mL round-bottomed flask. The mixture is agitated for about 17 hours, preparing polyamic acid.

Comparative Example 2

Polymer Synthesis

About 657 mg of bicyclo[2.2.2]oct-7-ene-2,3,5,6-tetracarboxylic dianhydride (BTDA) and about 9.5 mg of aminopropyl(trimethoxy)silane (APTMS) are agitated in dimethyl acetamide (DMAc) for about 5 hours in a 500 mL round-bottomed flask, and about 1133 mg of 2,2-bis[4-(3-aminophenoxy)benzene] (m-BAPS) is added to the round-bottomed flask. The mixture is agitated for about 17 hours. Then, about 7.2 mg of methyl(trimethoxysilane) (MTMS) and about 40 mg of $H_2O$ are dissolved in DMAc. The resulting solution is added to the round-bottomed flask while it is still being agitated. The mixture is agitated for 5 hours more, preparing polyamic acid.

Examples 3 and 4 and Comparative Examples 3 and 4

Film Fabrication

The polymers according to Examples 1 and 2 and Comparative Examples 1 and 2 are respectively coated on a glass substrate treated with octyltrichlorosilane, $N_2$-purged at about 50° C. for about 1 hour, maintained under vacuum at about 80° C. for about one hour, and heated to about 250° C. at a rate of about 1° C. per minute. Then, the coated substrates are heat-treated for about one hour under a $N_2$ atmosphere, fabricating films from the polymers of Examples 3 and 4 and Comparative Examples 3 and 4.

Infrared Spectra Analysis

Figure 2:
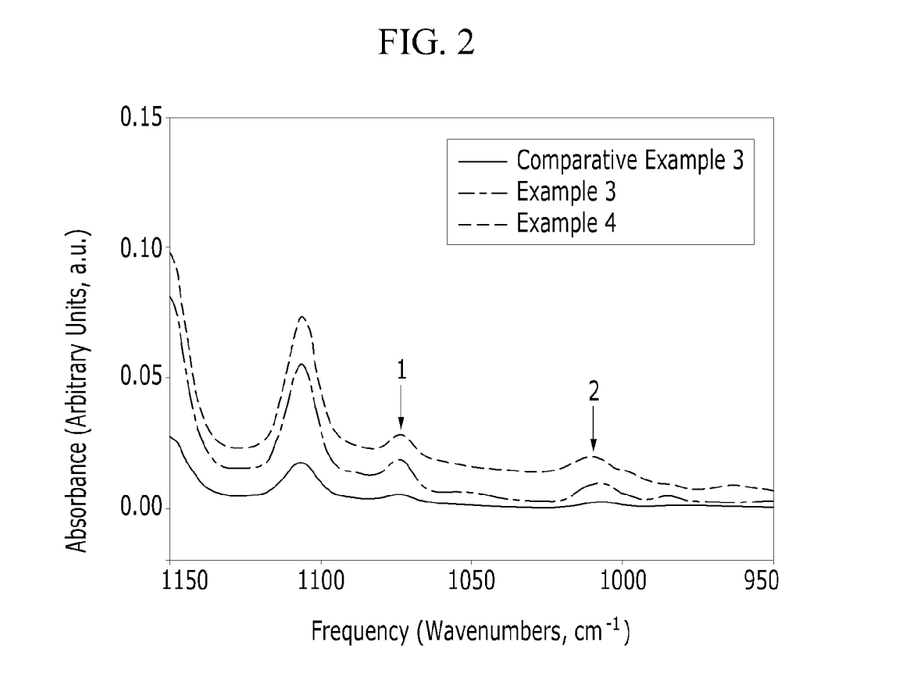
FIG. 2 is a graph showing absorbance (arbitrary units, a.u.) versus frequency (wavenumbers, $cm^{-1}$) of infrared spectral data acquired for the films of Examples 3 and 4 and Comparative Example 3.

The structures of the films according to Examples 3 and 4 and Comparative Examples 3 are analyzed from data acquired in an infrared ("IR") spectroscopic method. FIG. 2 provides infrared spectra of the films having peaks labeled as "1" and "2." As shown in FIG. 2, the films respectively exhibit a peak (peak No. 1) corresponding to an Si—O—Si stretching mode and a peak (peak No. 2) corresponding to an Si—$CH_3$ wagging mode respectively at 1070 wavenumbers ($cm^{-1}$) and 1020 $cm^{-1}$, having an absorption magnitude depending on the amount of silicon incorporated in the polymer from the organic compound used for its synthesis.

Thermal Properties

Figure 3:
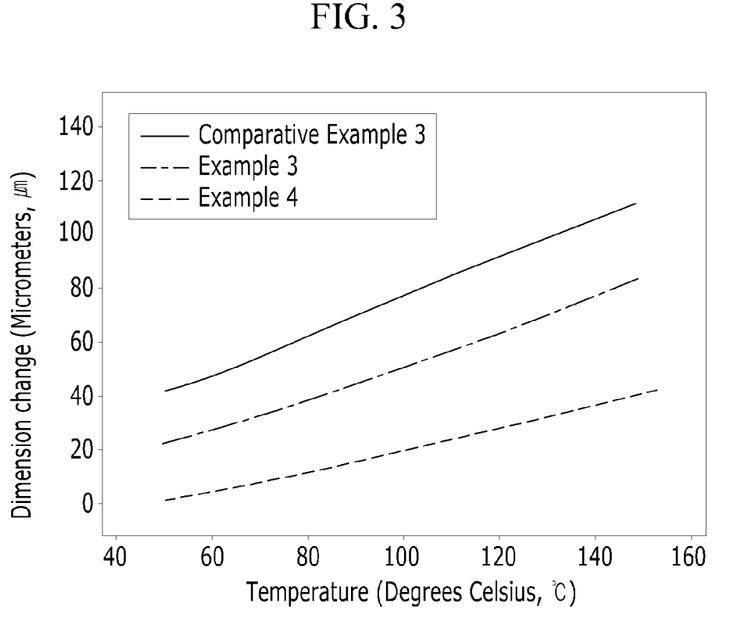
FIG. 3 is a graph showing dimension change (micrometers, μm) versus temperature (degrees Celsius, ° C.) for the films of Examples 3 and 4 and Comparative Example 3.

Thermal properties are derived from data acquired from films prepared from polymers of Examples 3 and 4 and Comparative Example 3. The dimension change as a function of temperature was measured using thermal mechanical analysis ("TMA"). Based on the dimension change measurement, the films are evaluated regarding their coefficient of thermal expansion (CTE). The data results are provided in FIG. 3, from which the slope of each curve corresponds to that film's coefficient of thermal expansion. As shown in FIG. 3, the films made of a polymer with an organic structure according to Examples 3 and 4 have a decreased coefficient of thermal expansion of 46 ppm/° C. and 42 ppm/° C., respectively. In contrast, the film of Comparative Example 3 has a coefficient of thermal expansion of 51 ppm/° C.

Optical Properties

The films according to Examples 3 and 4 and Comparative Examples 3 and 4 are evaluated regarding optical properties by measuring light transmittance and yellow index ("YI") with a spectrophotometer. The results are provided in the following Table 1.

TABLE 1

|  | Light transmittance (%) | Yellow index (YI) |
|---|---|---|
| Comparative Example 3 | 86 | 7.7 |
| Comparative Example 4 | 88 | 5.0 |
| Example 3 | 90 | 4.6 |
| Example 4 | 92 | 2.4 |

As shown in Table 1, the films including the organic compound of Chemical Formula 1 prepared according to Examples 3 and 4 have remarkably improved light transmittance and yellow index compared with the films prepared according to Comparative Examples 3 and 4.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments are exemplary in every aspect but do not limit the present invention.

What is claimed is:

1. A polymer comprising a structural unit represented by the following Chemical Formula 1:

Chemical Formula 1 wherein, in Chemical Formula 1, n and m are the same or different and each independently range from 4 to 12, k is an integer ranging from 1 to 10, L is a linker selected from a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted C3 to C30 heterocycloalkylene group, a substituted or unsubstituted C6 to C30 arylene group, a substituted or unsubstituted C6 to C30 aryleneoxy group, a substituted or unsubstituted C2 to C30 heteroarylene group, a substituted or unsubstituted C2 to C30 alkenylene group, a substituted or unsubstituted C2 to C30 alkynylene group, and a substituted or unsubstituted C1 to C30 amide group, and $R_a$ and $R_b$ are each independently selected from hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted C2 to C15 heteroaryl group, a substituted or unsubstituted C2 to C15 alkenyl group, a substituted or unsubstituted C2 to C15 alkynyl group, $NH_2$, a substituted or unsubstituted C1 to C15 amine group, a substituted or unsubstituted C1 to C15 alkyleneamine group, a substituted or unsubstituted C6 to C15 aryleneamine group, a substituted or unsubstituted C1 to C15 alkenyleneamine group, and a functional group represented by the following Chemical Formula 2, provided that at least one of $R_a$ and $R_b$ is an anhydride-derived functional group represented by Chemical Formula 3 or Chemical Formula 4:

Chemical Formula 2 wherein, in Chemical Formula 2, $R_1$, $R_2$, and $R_3$ are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group:

Chemical Formula 3 wherein, in Chemical Formula 3, $R_c$ is selected from a substituted or unsubstituted C1 to C20 alkylene group, a substituted or unsubstituted C1 to C20 alkyleneoxy group, a substituted or unsubstituted C1 to C20 fluoroalkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C6 to C20 aryleneoxy group, a substituted or unsubstituted C2 to C20 heteroarylene group, a substituted or unsubstituted C2 to C20 alkenylene group, a substituted or unsubstituted C2 to C20 alkynylene group, and a substituted or unsubstituted C1 to C20 amide group, $R_d$ is selected from a substituted or unsubstituted C1 to C15 alkyl group, a substituted or unsubstituted C1 to C15 fluoroalkyl group, a substituted or unsubstituted C3 to C10 cycloalkyl group, a substituted or unsubstituted C2 to C10 heterocycloalkyl group, a substituted or unsubstituted C6 to C20 aryl group, and a substituted or unsubstituted C2 to C20 heteroaryl group,

*(1) denotes a link to silicon, and *(2) denotes a link to an-other unit of the polymer:

Chemical Formula 4 wherein, in Chemical Formula 4, $R_e$ is a substituted or unsubstituted C2 to C10 alkylene group,

$R_f$ is selected from a single bond, a substituted or unsubstituted C1 to C20 alkylene group, a substituted or unsubstituted C1 to C20 alkyleneoxy group, a substituted or unsubstituted C1 to C20 fluoroalkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C6 to C20 aryleneoxy group, a substituted or unsubstituted C2 to C20 heteroarylene group, a substituted or unsubstituted C2 to C20 alkenylene group, a substituted or unsubstituted C2 to C20 alkynylene group, and a substituted or unsubstituted C1 to C20 amide group,

*(1) denotes a link to silicon, and *(2) denotes a link to another unit of the polymer, and further comprising units selected from polyamic acid units, polyimide units, polyaramid units, polyamide units, polyurethane units, polycarbonate units, polyacetal units, and a combination comprising at least one of the foregoing units.

2. The polymer of claim 1, wherein the anhydride-derived functional group of Chemical Formula 4 comprises a functional group represented by the following Chemical Formula 4-1:

Chemical Formula 4-1 wherein, in Chemical Formula 4-1,
*(1) denotes a link to silicon, and *(2) denotes a link to another unit of the polymer.

3. The polymer of claim 1, wherein the structural unit of Chemical Formula 1 is located at a main chain or a side chain of the polymer.

4. The polymer of claim 1, wherein the polymer is cross-linked via unit of Chemical Formula 1.

5. The polymer of claim 1, wherein the polymer comprises the structural unit represented by Chemical Formula 1 in an amount of about 0.1 mol % to about 50 mol % based on the entire amount of the polymer.

6. The polymer of claim 1, wherein the polymer with the structural unit represented by Chemical Formula 1 is prepared by polymerizing a monomer composition comprising monomers for synthesizing the polymer,
a silane compound represented by the following Chemical Formula 5, and
a silane compound represented by the following Chemical Formula 6:

Chemical Formula 5 wherein, in Chemical Formula 5,
$R_1$, $R_2$, $R_3$, $R'_1$, $R'_2$, and $R'_3$ are each independently the same as $R_1$, $R_2$, or $R_3$ in Chemical Formula 2, and L is the same as L in Chemical Formula 1;

Chemical Formula 6 wherein, in Chemical Formula 6,
$R_5$, $R_6$, and $R_7$ are the same or different, and are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group, and
A is an anhydride-derived functional group of Chemical Formula 3 or Chemical Formula 4.

7. The polymer of claim 6, wherein the silane compound represented by Chemical Formula 5 is used in an amount of about 0.1 wt % to about 99.9 wt % based on a weight of the composition, and the silane compound represented by Chemical Formula 6 is used in an amount ranging from about 99.9 wt % to about 0.1 wt % based on the weight of the composition.

8. The polymer of claim 5, wherein the monomer composition further comprises a silane compound represented by the following Chemical Formula 7:

Chemical Formula 7 wherein, in Chemical Formula 7,
$R_8$ is selected from hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted C2 to C15 heteroaryl group, a substituted or unsubstituted C2 to C15 alkenyl group, and a substituted or unsubstituted C2 to C15 alkynyl group, and
$R_9$, $R_{10}$, and $R_{11}$ are the same or different, and are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group.

9. The polymer of claim 8, wherein the silane compound represented by Chemical Formula 7 is used in an amount ranging from about 0.1 parts by weight to about 100 parts by weight based on 100 parts by weight of the silane compound represented by Chemical Formula 5.

10. The polymer of claim 1, wherein the polymer comprises polyimide units, cross-linked by at least one structural unit of Chemical Formula 1.

11. A composition comprising a polymer according to claim 1.

12. A film comprising a polymer according to claim 1.

13. The film of claim 10, wherein the film has a coefficient of thermal expansion ranging from about 10 ppm/° C. to about 50 ppm/° C.

14. The film of claim 10, wherein the film has a yellow index ranging from about 2.0 to about 7.0.

15. The film of claim 10, wherein the film has a light transmittance ranging from about 80% to about 94%.

16. A process of making a polymer, the process comprising:

polymerizing a monomer composition comprising:
monomers for synthesizing a polymer,
a silane compound represented by Chemical Formula 6, and
a silane compound represented by Chemical Formula 5 to form a composition; to form the polymer:

Chemical Formula 5 wherein, in Chemical Formula 5, $R_1$, $R_2$, $R_3$, $R'_1$, $R'_2$, and $R'_3$ are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group, and L is a linker selected from a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted C3 to C30 heterocycloalkylene group, a substituted or unsubstituted C6 to C30 arylene group, a substituted or unsubstituted C6 to C30 aryleneoxy group, a substituted or unsubstituted C2 to C30 heteroarylene group, a substituted or unsubstituted C2 to C30 alkenylene group, a substituted or unsubstituted C2 to C30 alkynylene group, and a substituted or unsubstituted C1 to C30 amide group, Chemical Formula 6 wherein, in Chemical Formula 6, $R_5$, $R_6$, and $R_7$ are the same or different, and are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group, and A is an anhydride-derived functional group represented by Chemical Formula 3 or Chemical Formula 4:

Chemical Formula 3 wherein, in Chemical Formula 3, $R_c$ is selected from a substituted or unsubstituted C1 to C20 alkylene group, a substituted or unsubstituted C1 to C20 alkyleneoxy group, a substituted or unsubstituted C1 to C20 fluoroalkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C6 to C20 aryleneoxy group, a substituted or unsubstituted C2 to C20 heteroarylene group, a substituted or unsubstituted C2 to C20 alkenylene group, a substituted or unsubstituted C2 to C20 alkynylene group, and a substituted or unsubstituted C1 to C20 amide group, $R_d$ is selected from a substituted or unsubstituted C1 to C15 alkyl group, a substituted or unsubstituted C1 to C15 fluoroalkyl group, a substituted or unsubstituted C3 to C10 cycloalkyl group, a substituted or unsubstituted C2 to C10 heterocycloalkyl group, a substituted or unsubstituted C6 to C20 aryl group, and a substituted or unsubstituted C2 to C20 heteroaryl group,

*(1) denotes a portion linked to silicon, and *(2) denotes a portion linked to a polymerized monomer, Chemical Formula 4 wherein, in Chemical Formula 4, $R_e$ is a substituted or unsubstituted C2 to C10 alkylene group, $R_f$ is selected from a single bond, a substituted or unsubstituted C1 to C20 alkylene group, a substituted or unsubstituted C1 to C20 alkyleneoxy group, a substituted or unsubstituted C1 to C20 fluoroalkylene group, a substituted or unsubstituted C3 to C20 cycloalkylene group, a substituted or unsubstituted C3 to C20 heterocycloalkylene group, a substituted or unsubstituted C6 to C20 arylene group, a substituted or unsubstituted C6 to C20 aryleneoxy group, a substituted or unsubstituted C2 to C20 heteroarylene group, a substituted or unsubstituted C2 to C20 alkenylene group, a substituted or unsubstituted C2 to C20 alkynylene group, and a substituted or unsubstituted C1 to C20 amide group,

*(1) denotes a link to silicon, and *(2) denotes a link to another unit of the polymer, and wherein the monomers for synthesizing a polymer are selected from monomers for synthesizing a polyamic acid, a polyimide, a polyaramid, a polyamide, a polyurethane, a polycarbonate, a polyacetal, and a combination comprising at least one of the foregoing.

17. The process of making a polymer of claim 16, wherein the silane compound represented by Chemical Formula 5 is present in the monomer composition in an amount of about 0.1 wt % to about 99.9 wt % based on the total weight of the composition, and the silane compound represented by Chemical Formula 6 is present in an amount of about 99.9 wt % to about 0.1 wt % based on the total weight of the composition.

18. The process of making a polymer of claim 16, wherein the monomer composition further comprises a silane compound represented by Chemical Formula 7:

Chemical Formula 7 wherein, in Chemical Formula 7, $R_8$ is selected from hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted C2 to C15 heteroaryl group, a substituted or unsubstituted C2 to C15 alkenyl group, and a substituted or unsubstituted C2 to C15 alkynyl group, and $R_9$, $R_{10}$, and $R_{11}$ are the same or different, and are each independently selected from hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C6 to C15 aryl group, a substituted or unsubstituted C2 to C15 heteroaryl group, a substituted or unsubstituted C2 to C15 alkenyl group, and a substituted or unsubstituted C2 to C15 alkynyl group.

\* \* \* \* \*